US008920742B2

(12) United States Patent
Norén

(10) Patent No.: US 8,920,742 B2
(45) Date of Patent: Dec. 30, 2014

(54) HEAT EXCHANGER MIXING SYSTEM

(75) Inventor: Tommy Norén, Veberöd (SE)

(73) Assignee: Alfa Laval Corporate AB, Lund (SE)

( * ) Notice: Subject to any disclaimer, the term of this patent is extended or adjusted under 35 U.S.C. 154(b) by 1017 days.

(21) Appl. No.: 12/158,080

(22) PCT Filed: Dec. 15, 2006

(86) PCT No.: PCT/SE2006/001428
§ 371 (c)(1),
(2), (4) Date: Jul. 8, 2008

(87) PCT Pub. No.: WO2007/073281
PCT Pub. Date: Jun. 28, 2007

(65) Prior Publication Data
US 2008/0314567 A1  Dec. 25, 2008

(30) Foreign Application Priority Data
Dec. 22, 2005  (SE) ...................... 0502876

(51) Int. Cl.
*B01J 19/24* (2006.01)
*B01F 5/06* (2006.01)
*F28D 9/00* (2006.01)

(52) U.S. Cl.
CPC ........... *F28D 9/00* (2013.01); *B01J 2219/2474* (2013.01); *B01F 5/061* (2013.01); *B01J 2219/2493* (2013.01); *B01J 2219/2461* (2013.01); *B01J 2219/2453* (2013.01); *B01J 19/249* (2013.01)
USPC ............ 422/198; 422/224; 165/175; 366/144

(58) Field of Classification Search
CPC ..................... B01J 2219/00096; B01J 19/245; B01J 49/249; F28F 3/086
USPC .................. 422/198, 205, 224; 165/172–176; 366/144
See application file for complete search history.

(56) References Cited

U.S. PATENT DOCUMENTS

| 4,373,579 A | 2/1983 | Jernqvist et al. |
| 2004/0035564 A1* | 2/2004 | Park et al. ...................... 165/153 |
| 2004/0109798 A1 | 6/2004 | Chopard et al. |

FOREIGN PATENT DOCUMENTS

| DE | 959916 C | 3/1957 |
| FR | 2130281 A1 | 11/1972 |
| GB | 2165345 A * | 4/1986 |
| JP | 11287573 | 10/1999 |
| SE | 114791 C | 4/1945 |
| SE | 163438 C | 6/1958 |
| WO | 9721061 A1 | 6/1997 |

(Continued)

OTHER PUBLICATIONS

Machine Translation of Japanese Patent Application No. 11-287573.

*Primary Examiner* — Timothy Cleveland
(74) *Attorney, Agent, or Firm* — MKG, LLC

(57) ABSTRACT

The present invention relates to a heat exchanger mixing system comprising at least one heat exchanger zone, at least one connection plate having one or more mixing units, at least four corners per connection plate, wherein each corner being either blind passage corner, a through-passage corner, a single passage corner, or a double passage corner, and the one or more mixing units are provided with static mixing elements. Present invention relates further to use of a heat exchanger mixing system, and a process for mixing fluids.

22 Claims, 9 Drawing Sheets

(56) References Cited

FOREIGN PATENT DOCUMENTS

| WO | 9951926 | A1 | 10/1999 |
| WO | 0246679 | A1 | 6/2002 |
| WO | 2004045761 | A1 | 6/2004 |

* cited by examiner

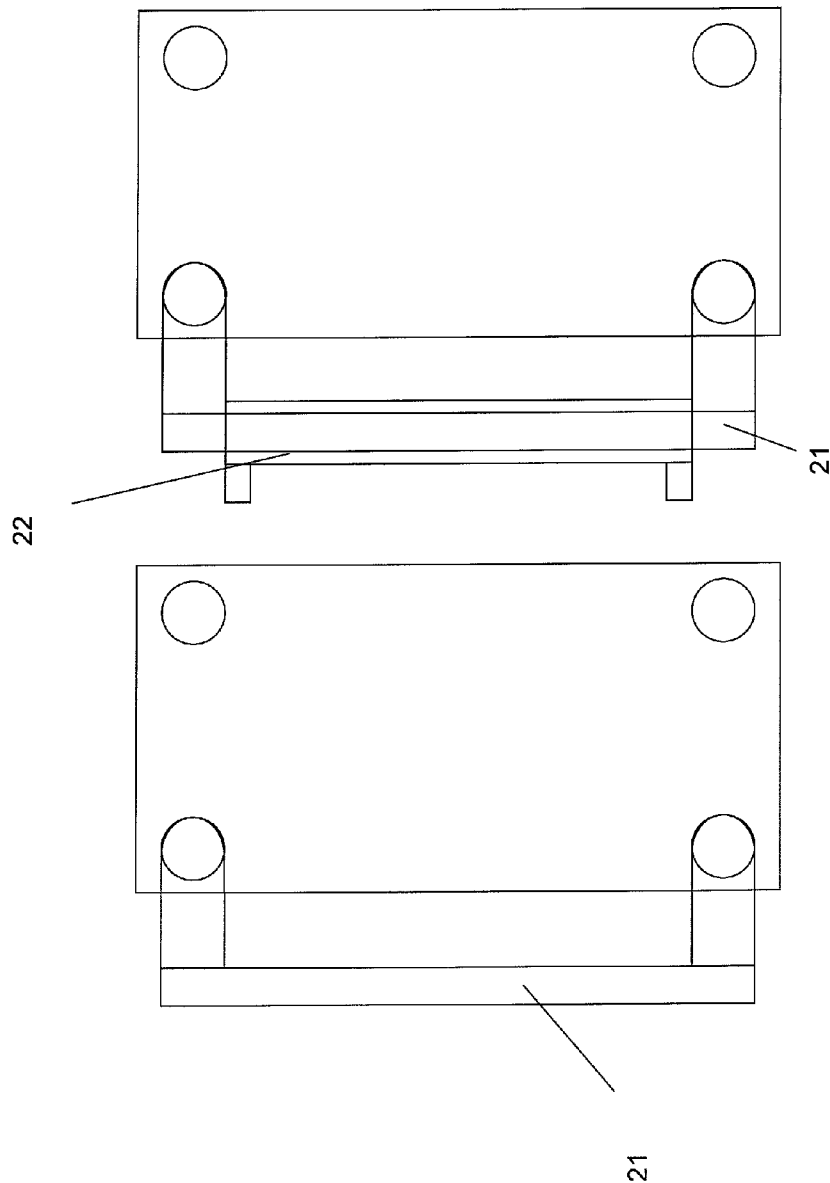

HEAT EXCHANGER MIXING SYSTEM

FIELD OF THE INVENTION

The present invention relates to a heat exchanger mixing system, use of a heat exchanger mixing system, and a process for mixing fluids.

BACKGROUND OF THE INVENTION

Mixers are often used for different applications wherein it is important that the contact between reactants, fluids, etc. is as great as possible. The contact is improved by turbulence and turbulence is effectuated by the use of different types of mixing elements. Due to the need for heat transfer in many of these operations the mixers are usually combined with heat exchangers.

Some mixers and heat exchanger combinations are known from literature for example WO 97/21061 discloses a plurality of cooperating assemblies each comprising a central tube, provided with one or more static mixing elements, an annular space surrounding the tube and a shell tube. The annular spaces form continues compartments, which enables transfer of heat to and from the process. A mixing element attached to an opening of a heat exchanger is disclosed by WO 2002/46679.

A device for processing fluids by controlling the residence time and/or the reaction time by the use of a single block or a set of several blocks or sublocks placed one next to the other is disclosed by US published patent application number US 2004/0109798.

One problem with the combined mixer heat exchangers of the prior art is the length of transportation between the mixer and reaction chamber. This results in inferior heat transfer, temperature control, and large equipment sizes. Thus, one object of the present invention is to design equipment with a more effective heat balance. Another object is to design a more compact mixer heat exchange system.

SUMMARY OF THE INVENTION

The present invention provides in one aspect, a compact system, which enables a more sufficient heat balance. Thus, the present invention relates to a heat exchanger mixing system comprising at least one heat exchanger zone, at least one connection plate having one or more mixing units, at least four fluid transfer corners per connection plate, wherein each fluid transfer corner, herein after called corner or corners, being either a blind passage corner, a through passage corner, a single passage corner, or a double passage corner. The one or more mixing units are provided with mixing elements. The blind corner acts as a stopper and no fluid passes through it. A through passage corner may pass fluids through a connection plate without mixing the fluids with any other fluids, or a through passage corner may be a passage into a connection plate from the outside of the plate. A single corner directs a flow of fluids in any pre-designed angle compared to the inlet angle, and the corner may be used for directing a flow of fluids into a connection plate or out of a connection plate, or may direct the flow to by-pass a connection plate. A double corner transfers two fluid flows in different directions without mixing the two flows. Double corners may be used for adding fluid flows to the system. Examples of corners, which may be used according to the invention, are disclosed in U.S. Pat. No. 4,373,579 and WO 99/51926. The invention comprises any type of suitable corners. The corners are connected to, for example, a connection plate, a mixing unit, a reactor zone, a heat exchanger zone, or combinations thereof. Fluids may be transferred by the corners into a connection plate or out a connection plate, or if the corner is a double corner it may transfer both process fluids and heat exchanger fluids for instance into or out of a connection plate, but a double corner may also transfer two process fluids to two mixing units, to two reactor zones, to two heat exchanger zones, or combinations thereof.

The heat exchanger zone or zones may be heat exchanger plates arranged on one or both sides of the at least one connection plate, or be placed between two or more connection plates. According to another alternative the heat exchanger zone may be a space inside a connection plate outside an internal mixing unit or the heat exchanger zone may surround an externally connected mixing zone. Thus, the at least one heat exchanger zone may be placed inside, outside, or both of the at least one connection plate. In yet another alternative the at least one heat exchanger zone may be placed as a combination of heat exchanger plates arranged on one or both sides of the at least one connection plate and of heat exchanger zones placed inside, outside, or both of the at least one connection plate.

According to one alternative two, three or more connection plates may be directly connected to each other between for instance two or more packages of heat exchanger plates, but as an alternative it may not be necessary that the heat exchange mixing system has heat exchanger plates, instead the system may have heat exchanging zones either externally, internally or both.

The connection plate may have a shape, which may be essentially square or rectangular, but any shape is possible as long as the performance of the heat exchanger mixing system produces the desired results. The connection plate may have a section, which may harbour mixing units, heat exchanger fluids, process fluids or combinations thereof. The at least one connection plate may have one or more mixing units connected externally, arranged internally or both. Inlets and outlets of the connection plate may be in communication with heat exchanger fluids or process fluids through the corners and the at least one connection plate may have at least one inlet and at least one outlet for fluids. The one or more mixing units may be connected externally of the connection plate. One process fluid may be transferred in a mixing unit inside the connection plate and another process fluid may be transferred in an externally placed mixing unit. The mixed process fluids may be combined and mixed together in yet another mixing unit all depending on the type of reaction or physical step the fluids are passing. The connection plate may harbour one or more mixing units internally, one may be inside a tube or other type of closed channel and another may be a mixing unit surrounding the tube or the other type of closed channel. In another alternative embodiment, the connection plate may harbour one or more mixing units arranged internally and at least one inlet and at least one outlet for heat exchanger fluids. The connection plate may be hermetically sealed. The corners may be integrated in at least one of the connection plates.

The mixing units may be provided with mixing elements. The mixing elements may have wings, fins, or other mixing promoting arrangements, the mixing elements could be nets, metallic foams, mesh, fins etc. The mixing elements may be selected from the group consisting of static mixers, helical mixers, combination of right- and left-turned mixer blades, vortex mixers, dynamic mixing elements, lanced offset turbulators, flow controlling inserts, metallic foams, mesh, etc. The mixing unit may be mixing elements such as flow controlling inserts disclosed by WO 2004/045761 the disclosure of which is incorporated herein by reference. The mixing unit and the mixing elements may be manufactured of, but not limited to, any suitable alloy, stainless steel, Hastelloy®, Inconel®, fluoropolymer, polyester, plastics, polyvinyl chloride (PVC), nylon, glassfibers, ceramics, (polypropylene, polystyrene, polycarbonate, polyethylene, poly(methyl) (met)acrylate, poly ether etherketone (PEEK), or combinations thereof.

The heat exchanger system may have one or more injection ports connected to, for instance, one or more corners or along the sides of one or more connection plates. The injection ports may be used for additives, reactants, etc. or for test sampling, monitoring of the flow of fluids etc. According to one alternative an injection port may be connected to a blind passage corner, a through passage corner, a single passage corner, or a double passage corner.

The heat exchanger system may be brazed, welded or both, or parts of the system may be brazed, welded or both, and the system may be clamped in a framework having at least two end plates, but it is not necessary that the system is clamped in a framework.

The present invention also relates to a heat exchanger mixing system, which may be used as a reactor, which system comprises one or more heat exchanger mixing systems and at least one reactor zone. The heat exchanger mixing reactor may comprise up to 10 heat exchanger mixing systems.

The heat exchanger mixing system may be used for chemical synthesis or reactions, unit operations such as dilutions of acids etc., food applications, agrochemicals, biochemicals etc. The heat exchanger mixing system may be used as a reactor.

The present invention also relates to a continuous process for mixing fluids, which comprises the transfer of at least one first process fluid and at least one second process fluid. The fluids may be solvents, dilution fluids, etc. or may be reacting fluids or fluids having added reactants, catalysts or the like. The fluids may be led through at least one first corner into at least one internally connected mixing unit of a connection plate of a heat exchange mixing system or the fluids may be transferred through at least one first corner into at least one externally connected mixing unit. The first and the second process fluids may be mixed together, heat may be transferred to or from the mixing unit. The mixed process fluid may be transferred out of the mixing unit through at least one second corner for further processing in a heat exchanger zone or in a reactor zone of another heat exchange mixing system. The process may comprise transferring internal heat exchanger fluids through at least two corners to external heat exchanger plates, or the process may comprise transferring internal heat exchanger fluids into the connection plate through at least one first corner and transferring the internal heat exchanger fluids out of the connection plate through at least one second corner for further heat exchanging. In another alternative embodiment, the process may comprise transferring external heat exchanger fluids into the connection plate through at least one first corner and transferring the external heat exchanger fluids out of the connection plate through at least one second corner. According to a further alternative the process may comprise transferring external heat exchanger fluids into at least one external temper unit of the external mixing unit and transferring the external heat exchanger fluids out of at least one external temper unit of the external mixing unit.

BRIEF DESCRIPTION OF THE DRAWINGS

The invention will further be described in more details by the aid of FIGS. 1 to 15. The Figures are only for the purpose of illustrating the invention and not to limit its scope.

FIG. 14 schematically illustrates an external mixing unit connected to a connection plate and an internal tempering device.

FIG. 15 schematically illustrates an external mixing unit having external tempering device connected to a connection plate.

DETAILED DESCRIPTION OF THE PREFERRED EMBODIMENTS

Figure 1:
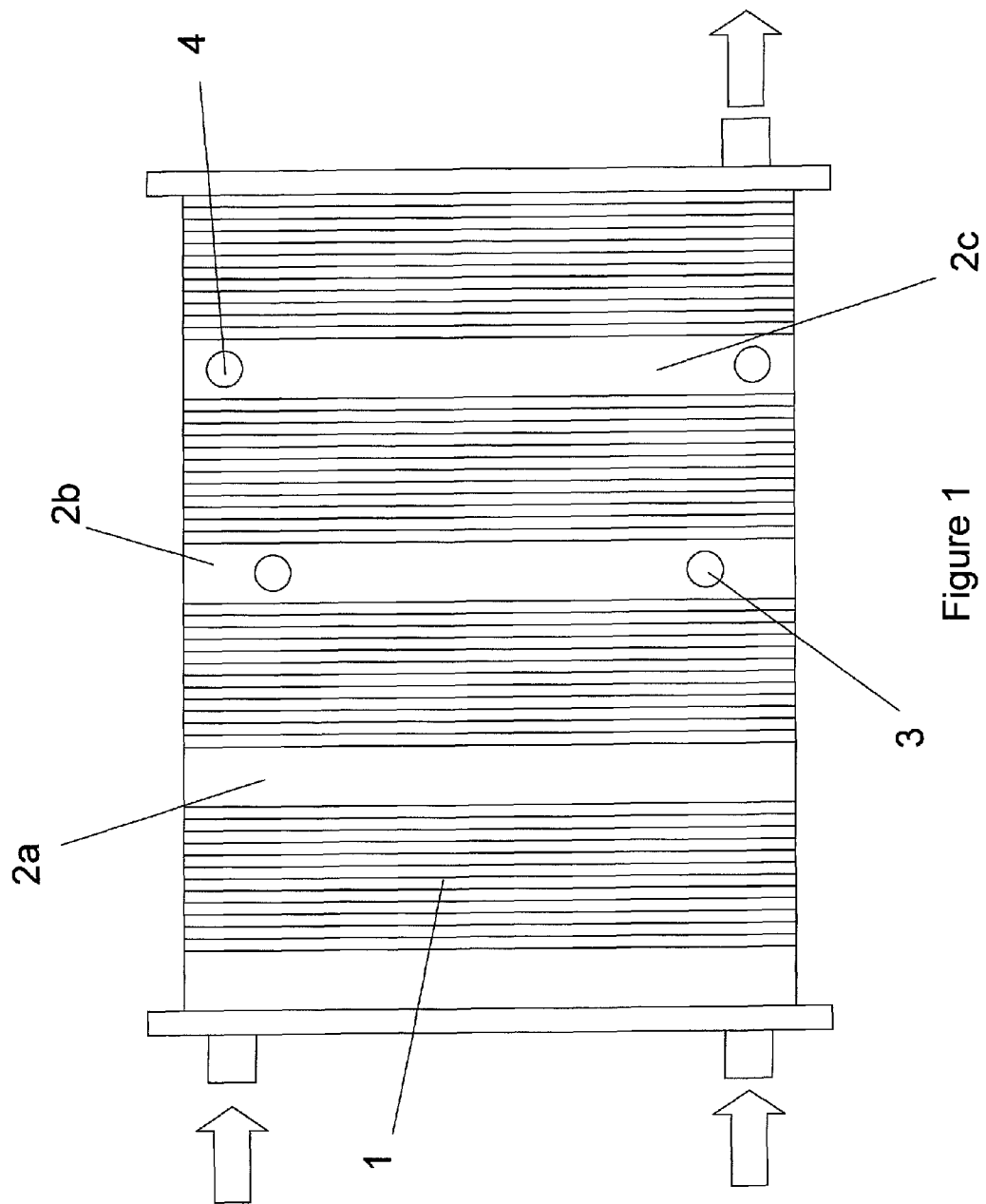
FIG. 1 schematically illustrates one embodiment of a heat exchanger mixing system of the invention.
Figure 2:
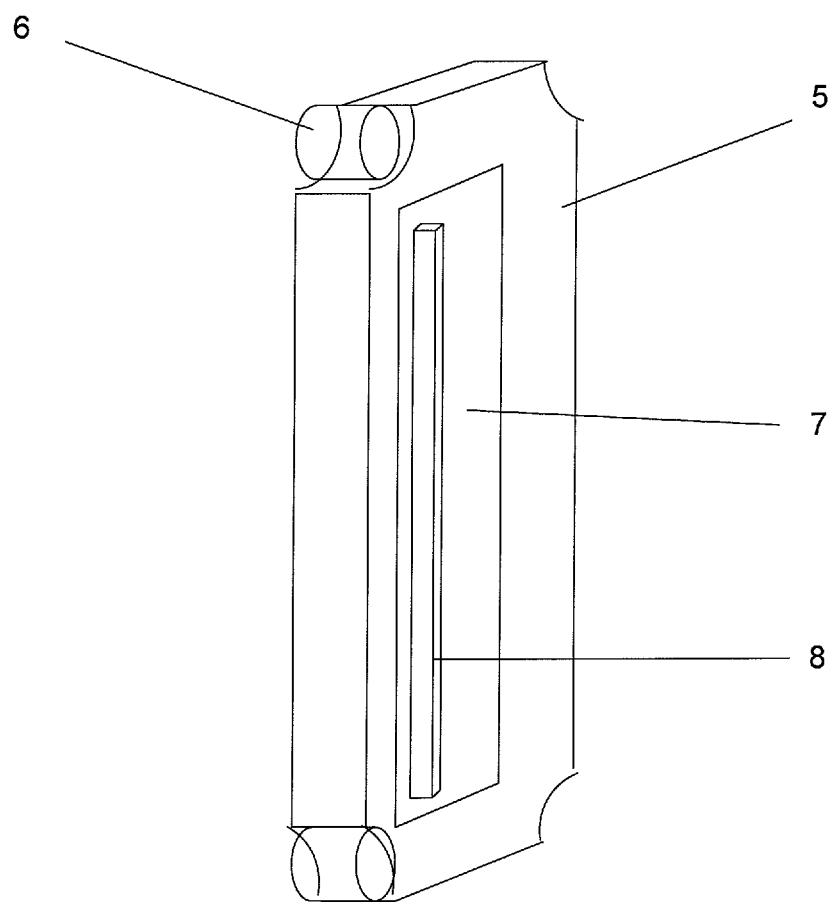
FIG. 2 is a simplified schematic representation of a connection plate of the invention.

In FIG. 1 the invention is schematically represented for the purpose of defining and visualising the parts of the heat exchanger mixing system according to one alternative embodiment of the present invention. The system comprises heat exchanger plates 1 and connection plates 2a, 2b and 2c. Connection plate 2a is representing a connection plate having for instance an internal mixing unit and internal tempering device not shown. Connection plate 2b has external connections 3 for flow of additives, reactants etc., for an external mixing unit, for an external tempering device, or for additional heat exchanger fluids for internal tempering of for instance a mixing unit. Connection plate 2c has corners 4 for additional process fluids, reactants or for heat exchanger fluids. Each connection plate 5 has at least four corners 6, see FIG. 2, which are connected to one or more mixing units 7 or are connected to a tempering device having a flow of heat exchange fluids not seen in FIG. 2. The mixing units 7 may either be incorporated internally in connection plate 5 or be externally connected to the connection plate, according to one alternative embodiment of the invention the mixing units may be connected both externally and internally on the same connection plate. The mixing units are constructed with mixing elements 8, which either are part of the mixing unit or a separate part to be added into the mixing unit or connection plate.

Figure 3:
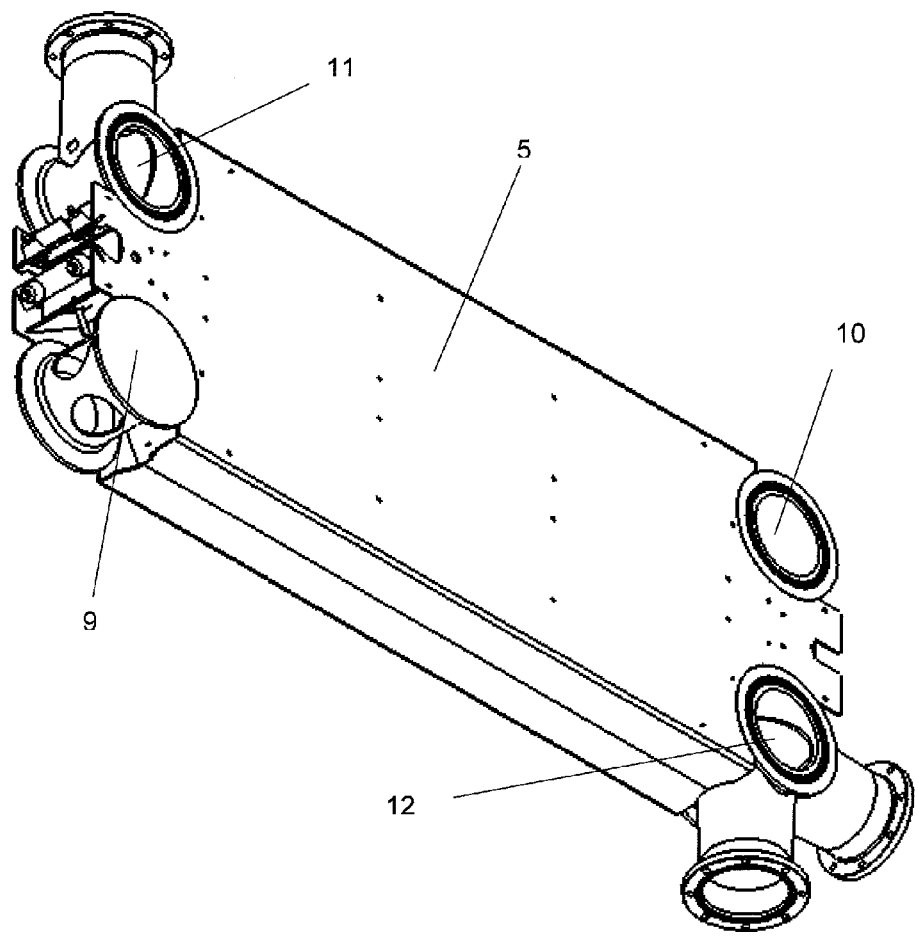
FIG. 3 is a perspective view of a connection plate having four corners for process fluids, heat exchanger fluids etc.
Figure 4:
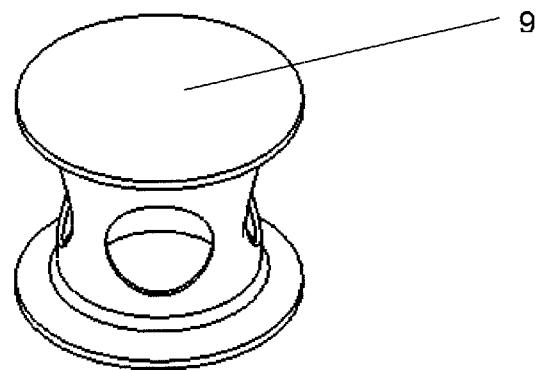
FIG. 4 is a perspective view of a blind passage corner.
Figure 5:
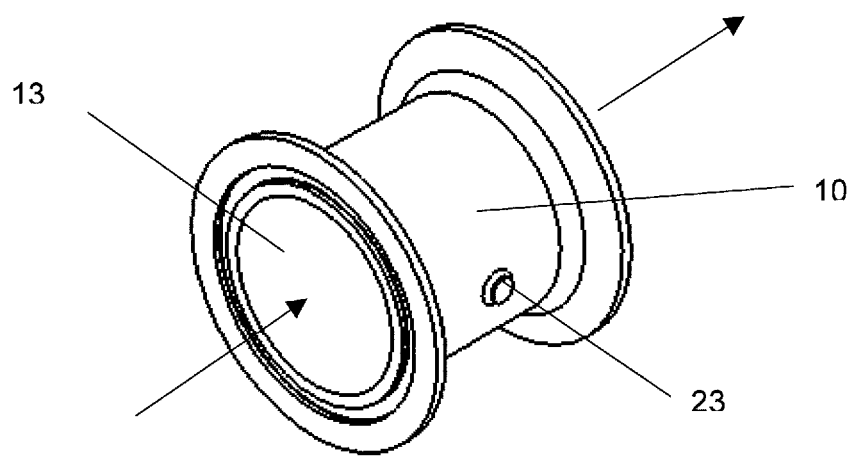
FIG. 5 is a perspective view of a through passage corner.
Figure 6:
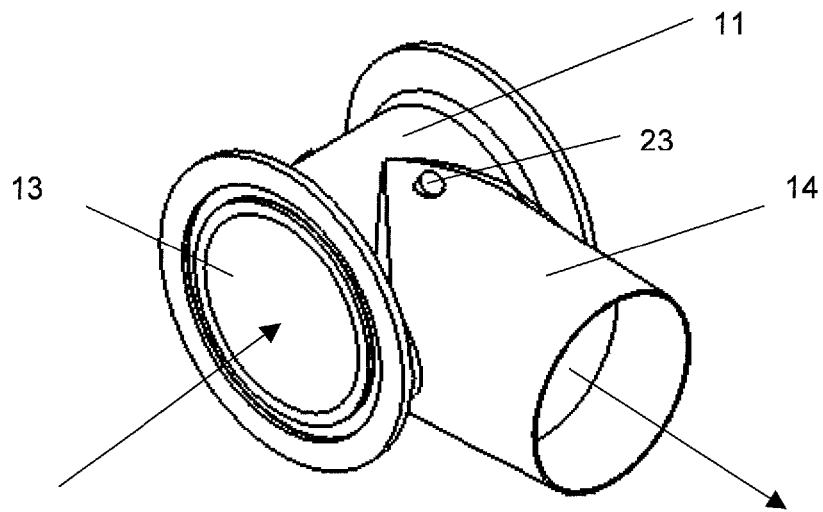
FIG. 6 is a perspective view of a single passage corner.
Figure 7:
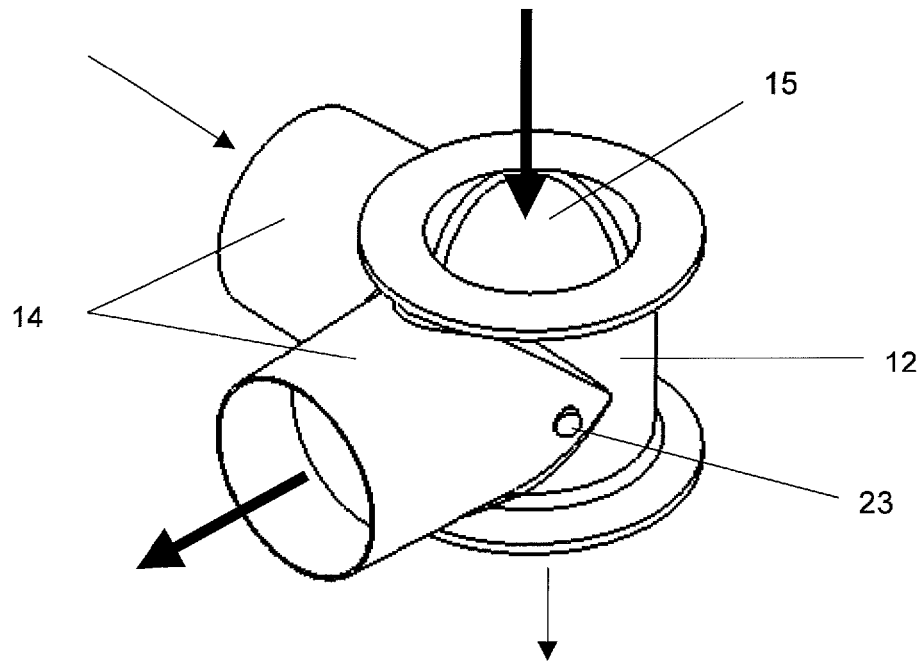
FIG. 7 is a perspective view of a double passage corner.

FIG. 3 shows an alternative connection plate 5 having four different corners 9, 10, 11 and 12 arranged to connection plate 5. Corner 9 in FIG. 4 is a blind corner, which may act as a stopper when connected to a connection plate. Corner 10 in FIG. 5 is a through passage corner having a hole 13 for passage of fluids, which corner may pass fluids through a connection plate without mixing the fluids with any fluids in the connection plate. Corner 10 may also connect fluids within a connection plate with any kind of external fluid device, or may connect a connection plate to an additional fluid to be added to a mixing system of the invention. Single corner 11 in FIG. 6 is directing one fluid flow through hole 13 into tube 14 and out, or is directing the fluids trough tube 14 and out of hole 13, that means that single corner may transfer fluids from a neighbouring plate into or out of a connection plate or into or out of a mixing unit. A single corner may also be used to add fluids to a mixing system according to the invention. Double corner 12 in FIG. 7 has a wall 15 separating two fluids from each other. Double corner 12 directs two fluid flows without mixing them. Double corners 12 may add multi-functions to a connection plate or a mixing system. The flow of fluids through the double corner may be in any direction suitable for the system.

Figure 8:
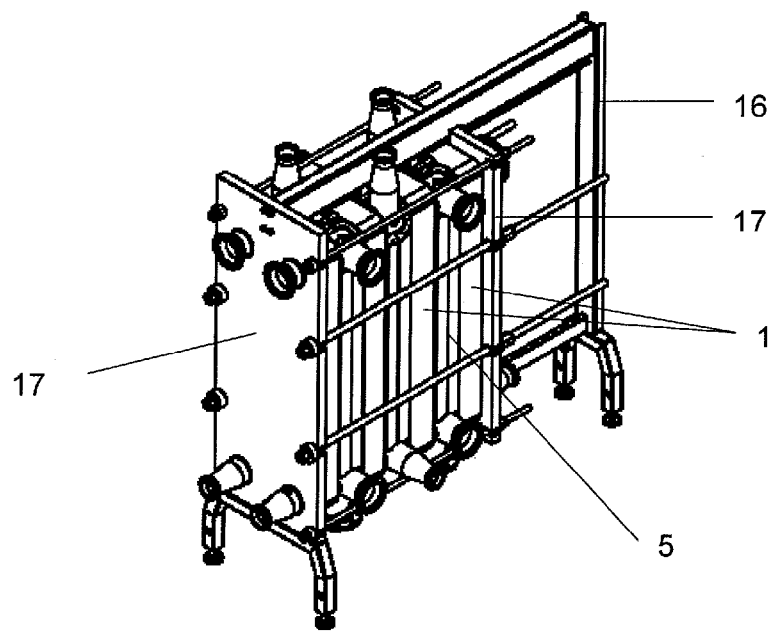
FIG. 8 is a perspective view of another alternative example of a heat exchanger mixing system of the invention arranged with corners.
Figure 9:
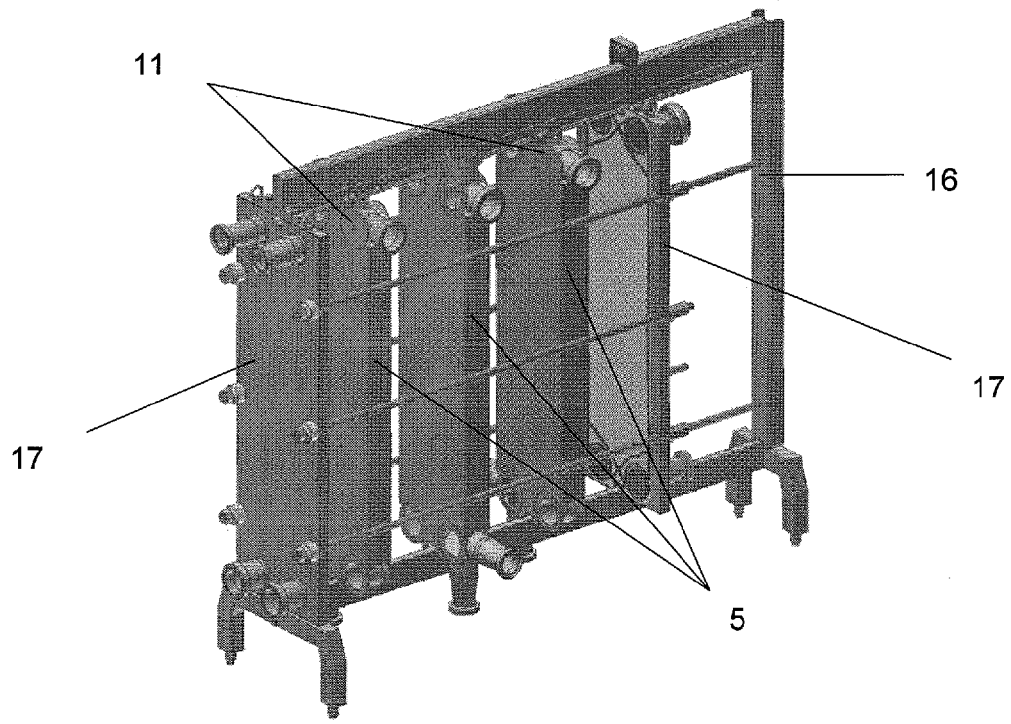
FIG. 9 is a perspective view of another alternative example of a heat exchanger mixing system of the invention having the connection plates spaced apart.

FIG. 8 shows a mixing system having heat exchanger plates 1 and connection plates 5 within a frame 16. Two end plates 17 stabilize the system within frame 16. Different corners are arranged to direct fluids into or out of the connection plates and thus add to the multi-function of the mixing system of the invention. The mixing system seen in FIG. 9 shows connection plates 5 spaced apart within a frame 16. In this figure it can be seen that for instance single corners 11 stop flows of fluids from one side of a connection plate or heat exchanger plate 1, and add fluid flows from the outside of the connection plate or heat exchanger plate into the connection plate or heat exchanger plate.

Figure 12:
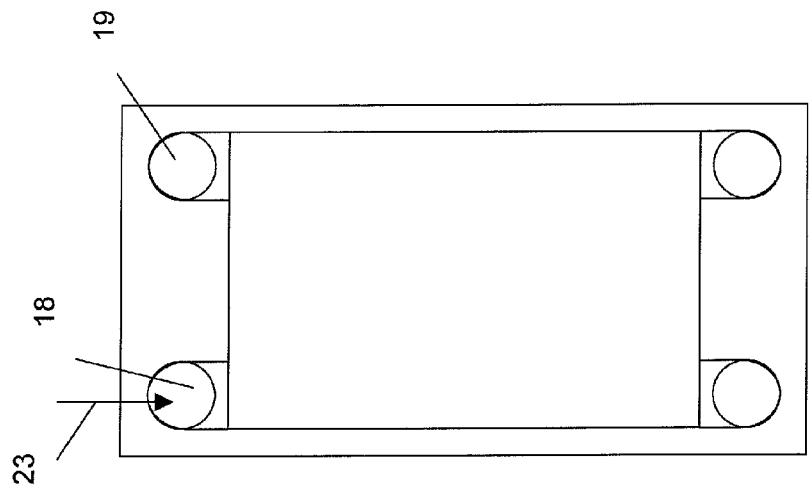
FIG. 12 schematically illustrates a connection plate having an internal tempering device connected to an internal mixing unit.
Figure 11:
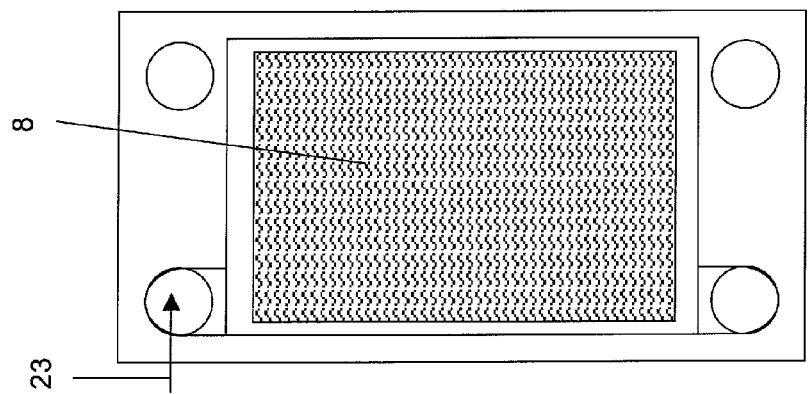
FIG. 11 schematically illustrates a connection plate having an internal static mixing unit.
Figure 10:
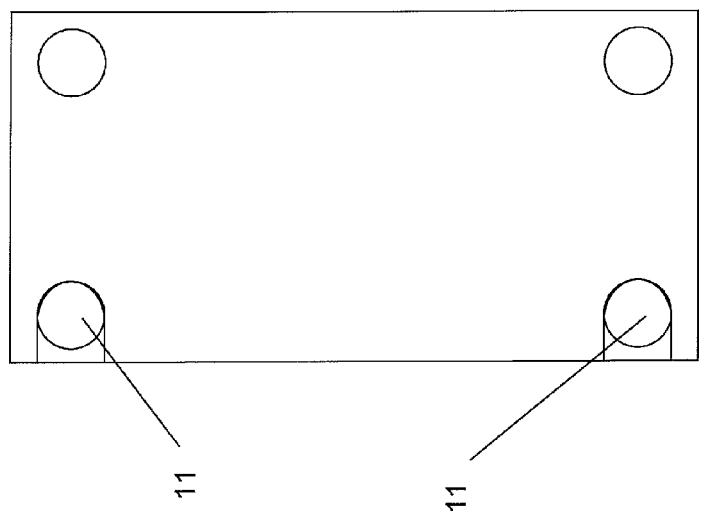
FIG. 10 schematically illustrates a connection plate having single corners and through passage corners.

FIGS. 10 to 15 are all schematic presentations of different possibilities of mixing internally or externally of the mixing system according to the invention. The connection plate in FIG. 10 is equipped with single corners 11 for connecting fluids to an outside source, which could be an external mixing unit or could be additional fluids to be treated within a heat exchanger mixing system of the invention. The connection plate is also equipped with two corners, which could be either blind corners 9 or through passage corners 10, or one of each. The connection plate in FIG. 11 is equipped with an internal mixing element 8. FIG. 12 shows a connection plate in which one flow of fluids 18 is directed into a mixing unit or an open space, and another flow of fluids 19 is directed into the connection plate to an internal temper device to internally temper flow 18, without mixing flow 18 with flow 19. An external flow of tempering fluids is led through connections 20, see FIG. 13, which connections 20 may be through passage corners 10. The external flow of tempering fluids is led into an internal temper device within the connection plate having single corners in FIG. 13, to temperate fluids in the mixing unit or the open space, which may be used as reaction space without mixing. An external mixing unit 21 is connected to a connection plate in FIG. 14 and in FIG. 15 is mixing unit 21 equipped with an external temper device 22.

Figure 13:
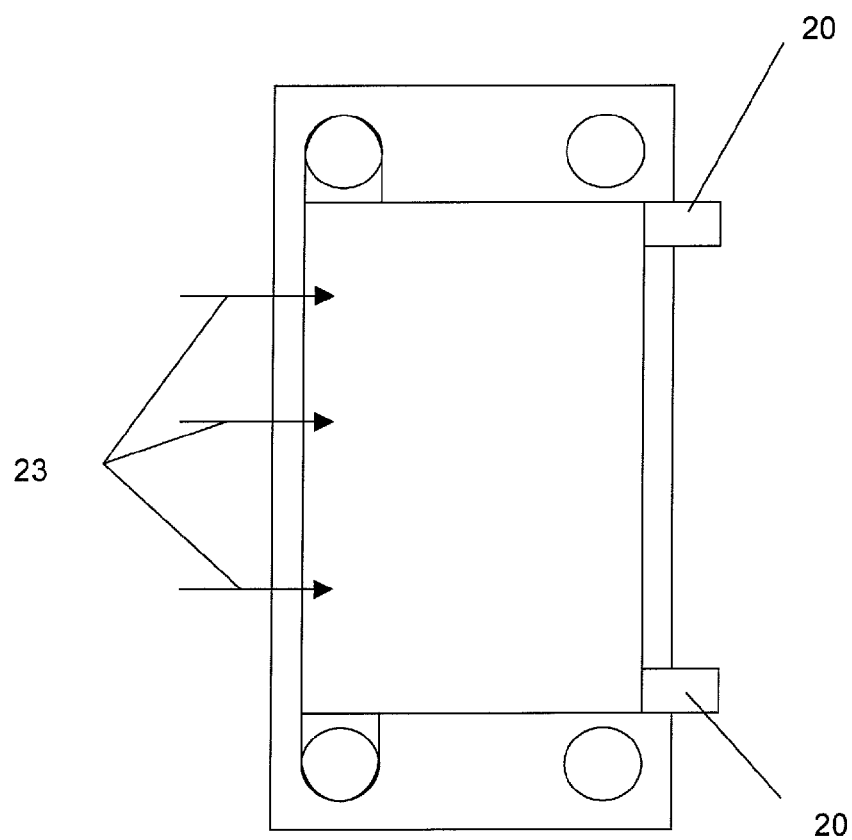
FIG. 13 schematically illustrates an internal mixing unit having an external temper device.

One or more injection ports 23 may be connected to one or more corners or to one or more sides of a connection plate. In FIGS. 11 and 12 are injection port 23 connected to a corner. FIG. 13 shows several injection ports 23 connected along one side of a connection plate. Injection ports 23 may be connected to a corner which can be seen in FIG. 5, 6 or 7.

What is claimed is:

1. A heat exchanger mixing system comprising at least one heat exchanger zone, at least one connection plate (5) having one or more mixing units and each connection plate (5) has at least four connection sites each being operable to be selectively equipped with one of a plurality of corners (6) and in which one of the plurality of corners (6) is selectively connected, wherein each of the plurality of corners (6) is either a blind passage corner (9), a through-passage corner (10), a single passage corner (11), or a double passage corner (12), the one or more mixing units are provided with mixing elements comprising at least one of static mixers, helical mixers, bidirectional mixer blades, vortex mixers, dynamic mixing elements, flow directing inserts, metallic foams and mesh, at least one of the plurality of corners (6) is an inlet for process fluids to the one or more mixing units, the inlet being in communication with the one or more mixing units, and at least one of the plurality of corners (6) is an outlet for the process fluids from the one or more mixing units, the outlet being in communication with the one or more mixing units and the one or more mixing units are arranged inside the at least one connection plate (5), wherein one or more ports are connected to the at least one of the plurality of corners (6), or connected along one or more sides of the one or more connection plates (5), or combinations thereof, for additives, for reactants, for test sampling, for monitoring, or combinations thereof into or from the process fluids.

2. The heat exchanger mixing system according to claim 1, wherein the at least one heat exchanger zone include heat exchanger plates arranged on one or both sides of the at least one connection plate.

3. The heat exchanger mixing system according to claim 1, wherein the at least one heat exchanger zone is located at least at one of inside and outside of the at least one connection plate.

4. The heat exchanger mixing system according to claim 1, wherein the at least one heat exchanger zone includes a combination of heat exchanger plates arranged on one or both sides of the at least one connection plate and of heat exchanger zones placed at least one of inside and outside, the at least one connection plate.

5. The heat exchanger mixing system according to claim 1, wherein the at least one connection plate has a shape, which is essentially square or rectangular.

6. The heat exchanger mixing system according to claim 1, wherein the at least one connection plate has one or more mixing units connected externally, arranged internally or both of the at least one connection plate.

7. The heat exchanger mixing system according to claim 1, wherein the at least one connection plate has at least one inlet and at least one outlet for fluids.

8. The heat exchanger mixing system according to claim 1, wherein the at least one connection plate has one or more mixing units connected externally.

9. The heat exchanger mixing system according to claim 1, wherein the at least one connection plate has least one inlet and at least one outlet for heat exchanger fluids.

10. The heat exchanger mixing system according to claim 1, wherein the at least one connection plate is hermetically sealed.

11. The heat exchanger mixing system according to claim 1, wherein the mixing unit and the mixing elements are manufactured of at least one of, stainless steel, Hastelloy®, Inconel®, flouropolymer, polyester, plastics, polyvinyl chloride (PVC), nylon, glass fibers, ceramics, polypropylene, polystyrene, polycarbonate, polyethylene, poly(methyl) (met)acrylate, and poly ether etherketone (PEEK).

12. The heat exchanger mixing system according to claim 1, wherein the at least one connection plate comprises two or more connection plates that are directly connected to each other.

13. A heat exchanger mixing system comprising at least one heat exchanger zone, at least one connection plate (5) having one or more mixing units, each connection plate (5) has at least four connection sites each being operable to be selectively equipped with one of a plurality of corners (6) and in which the one of the plurality of corners (6) is selectively connected, wherein each of the plurality of corners (6) is either a blind passage corner (9), a through-passage corner (10), a single passage corner (11), or a double passage corner (12), the one or more mixing units are provided with mixing elements, wherein at least one of the plurality of corners (6) is an inlet for process fluids to the one or more mixing units, the inlet being in communication with the one or more mixing units, and at least one of the plurality of corners (6) is an outlet for the process fluids from the one or more mixing units, the outlet being in communication with the one or more mixing units, at least one of the one or more mixing units are arranged inside the at least one connection plate (5), wherein one or more ports are connected to the at least one of the plurality of corners (6), or connected along one or more sides of the one or more connection plates, or combinations thereof, for additives, for reactants, for test sampling, for monitoring, or combinations thereof into or from the process fluids.

14. A heat exchanger mixing system comprising at least one heat exchanger zone, at least one connection plate (5) having one or more mixing units, each connection plate (5) has at least four connection sites each being operable to be selectively equipped with one of a plurality of corners (6) and in which one of the plurality of corners (6) is selectively connected, wherein each of the plurality of corners (6) is either a blind passage corner (9), a through-passage corner (10), a single passage corner (11), or a double passage corner (12), wherein the one or more mixing units are provided with mixing elements and wherein at least one of the one or more mixing units is configured to transport at least one process fluid through and between the plurality of corners (6) and the one or more mixing units, two or more of the plurality of corners (6) are in communication with the at least one heat exchanger zone to transfer heat exchanger fluids between at least two of the at least one heat exchanger zone without the mixing heat exchanger fluids with the at least one process fluid and at least one of the one or more mixing units are arranged inside the at least one connection plate, wherein one or more ports are connected to the at least one of the plurality of corners (6), or connected along one or more sides of the one or more connection plates, or combinations thereof, for additives, for reactants, for test sampling, for monitoring, or combinations thereof into or from the at least one process fluid.

15. The heat exchanger mixing system according to claim 1, wherein at least one of the one or more mixing units are arranged outside the at least one connection plate.

16. The heat exchanger mixing system according to claim 1, wherein the one or more mixing units are configured to mix two or more process fluids.

17. The heat exchanger mixing system according to claim 13, wherein at least one of the one or more mixing units are arranged outside the at least one connection plate.

18. The heat exchanger mixing system according to claim 13, wherein the mixing units are configured to mix two or more process fluids.

19. The heat exchanger mixing system according to claim 13, wherein the at least one heat exchanger zone includes heat exchanger plates arranged on one side or on both sides of the at least one connection plate.

20. The heat exchanger mixing system according to claim 14, wherein at least one of the one or more mixing units are arranged outside the at least one connection plate.

21. The heat exchanger mixing system according to claim 14, wherein the mixing units are configured to mix two or more process fluids.

22. The heat exchanger mixing system according to claim 15, wherein the at least one heat exchanger zone includes heat exchanger plates arranged on one side or on both sides of the at least one connection plate.

* * * * *